(12) United States Patent
Liu et al.

(10) Patent No.: US 11,318,836 B2
(45) Date of Patent: May 3, 2022

(54) ELECTRICAL BRIDGE DRIVING SYSTEM AND VEHICLE

(71) Applicant: Schaeffler Technologies AG & Co. KG, Herzogenaurach (DE)

(72) Inventors: Lei Liu, Changzhou (CN); Qingquan Zhai, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/050,542

(22) PCT Filed: May 7, 2018

(86) PCT No.: PCT/CN2018/085821
§ 371 (c)(1),
(2) Date: Oct. 26, 2020

(87) PCT Pub. No.: WO2019/213802
PCT Pub. Date: Nov. 14, 2019

(65) Prior Publication Data
US 2021/0237568 A1 Aug. 5, 2021

(51) Int. Cl.
| | |
|---|---|
| *B60K 1/00* | (2006.01) |
| *B60K 17/16* | (2006.01) |
| *B60K 17/08* | (2006.01) |
| *H02K 7/00* | (2006.01) |
| *B60K 6/42* | (2007.10) |

(52) U.S. Cl.
CPC ............... *B60K 17/16* (2013.01); *B60K 1/00* (2013.01); *B60K 17/08* (2013.01); *H02K 7/006* (2013.01); *B60K 6/42* (2013.01); *B60K 2001/001* (2013.01); *B60Y 2400/73* (2013.01)

(58) Field of Classification Search
CPC .......... B60K 17/16; B60K 17/08; B60K 1/00; B60K 2001/001; B60K 6/42; H02K 7/006; B60Y 2400/73
See application file for complete search history.

(56) References Cited

U.S. PATENT DOCUMENTS

| | | | |
|---|---|---|---|
| 2018/0076687 A1* | 3/2018 | Pritchard | B60K 7/0007 |
| 2018/0216713 A1* | 8/2018 | LaForce | B60K 17/02 |

FOREIGN PATENT DOCUMENTS

| | | | | |
|---|---|---|---|---|
| CN | 105090390 B | * | 11/2017 | ......... F16H 37/0813 |
| CN | 107323255 A | | 11/2017 | |
| CN | 207049266 U | | 2/2018 | |
| DE | 102004017163 A1 | | 10/2005 | |
| DE | 102010031744 A1 | | 1/2012 | |

(Continued)

*Primary Examiner* — Justin Holmes
(74) *Attorney, Agent, or Firm* — Antun Peakovic

(57) ABSTRACT

An electrical bridge driving system for a vehicle includes: an electric motor; a transmission shaft connected for co-rotation with the electric motor; a first gear provided on the transmission shaft; a second gear engaged with the first gear; a planetary gear apparatus, wherein the second gear is connected for co-rotation to an input end of the planetary gear apparatus; and a differential mechanism, wherein an output end of the planetary gear apparatus is connected for co-rotation to an input end of the differential mechanism. The second gear, the planetary gear apparatus, and the differential mechanism are coaxial. The electrical bridge driving system can have a larger transmission ratio in a compact space.

6 Claims, 3 Drawing Sheets

(56) References Cited

FOREIGN PATENT DOCUMENTS

| DE | 102016215011 A1 | 2/2018 | | |
|---|---|---|---|---|
| WO | WO-2012007030 A1 | * | 1/2012 | ............... B60K 1/00 |
| WO | WO-2012049557 A2 | * | 4/2012 | ............. H02K 7/006 |
| WO | WO-2016055322 A1 | * | 4/2016 | ............... B60K 1/00 |

* cited by examiner

ELECTRICAL BRIDGE DRIVING SYSTEM AND VEHICLE

CROSS-REFERENCE TO RELATED APPLICATIONS

This application is the U.S. National Phase of PCT Appln. No. PCT/CN2018/085821 filed May 7, 2018, the entire disclosure of which is incorporated by reference herein.

TECHNICAL FIELD

The present disclosure relates to an electrical bridge driving system. More specifically, the present disclosure relates to a single-speed electrical bridge driving system.

BACKGROUND

An electrical bridge driving system is used for hybrid vehicles or pure electric vehicles. FIG. 1 is a schematic diagram of a single-speed electrical bridge driving system. As shown in FIG. 1, the electrical bridge driving system may comprise an electric motor 100, an input shaft 200, a planetary gear apparatus 300, a transmission gear 410, a parking gear 420 and a differential mechanism 500. The transmission gear 410, the parking gear 420 and the planetary gear apparatus 300 are sequentially arranged on the input shaft 200 along a direction away from the electric motor 100. A sun gear of the planetary gear apparatus 300 is fixed on the input shaft 200. A planetary carrier of the planetary gear apparatus 300 is rotatably supported on a housing (not shown) of the electrical bridge driving system by means of ball bearings. An outer gear ring of the planetary gear apparatus 300 is fixed to the housing. The transmission gear 410 and the parking gear 420 are fixed to the planetary carrier by means of welding. An electric motor shaft 110 of the electric motor 100 is supported on an electric motor housing (not shown) by means of bearings. The input shaft 200 is connected for co-rotation with the electric motor shaft 110 of the electric motor 100 by means of a spline at one end thereof, and is rotatably supported on the planetary carrier by means of ball bearings at the other end thereof. The differential mechanism 500 is a planetary gear differential mechanism. The differential mechanism 500 includes an input gear 510 that is engaged with the transmission gear 410. The planetary carrier of the differential mechanism 500 is integrated with the input gear 510, and is rotatably supported on the housing by means of bearings. The differential mechanism 500 comprises a plurality of long planetary gears and a plurality of short planetary gears, which are supported on the planetary carrier by means of pins respectively. The differential mechanism 500 further comprises a large half axle gear and a small half axle gear, the long planetary gears being engaged with the short planetary gears, while the large half axle gear being engaged with the long planetary gears, and the small half axle gear being engaged with the short planetary gears. Thus, a power will be transferred from the input gear 510 to the two half axles of the differential mechanism 500. In a parking state, the parking gear 420 is engaged with an external parking apparatus (not shown) to lock the half axles of the differential mechanism 500.

This kind of electrical bridge driving system requires a complex support structure when supporting the input shaft and the planetary carrier, and more and larger bearings will increase the cost. Given the input shaft and the bearings for the input shaft, a planetary carrier and bearings for the planetary carrier in a large size are required. The complex structure of the planetary carrier and the welding of the transmission gear and the parking gear to the planetary carrier will increase the manufacturing difficulty and cost, and the lubrication of the planetary gear apparatus is more difficult. The size of the transmission gear is limited by the input shaft and the planetary carrier, which will affect the transmission ratio of the electrical bridge driving system. Since the input shaft is supported by bearings on only one side, there is insufficient support for the input shaft. The planetary gear differential mechanism has a complex structure and many components. It is difficult for this kind of electrical bridge driving system to achieve a larger transmission ratio in a compact layout without use of an intermediate shaft.

As a result, an improved electrical bridge driving system is required.

SUMMARY

It is desirable to provide an electrical bridge driving system having an improved support structure. It is also desirable to provide an electrical bridge driving system having a better support stiffness. It is also desirable to provide an electrical bridge driving system capable of reducing the axial size and cost. It is also desirable to provide an electrical bridge driving system having a larger transmission ratio in a compact space. Finally, it is also desirable to provide an electrical bridge driving system with good lubrication performance and NVH.

An electrical bridge driving system for a vehicle includes: an electric motor; a transmission shaft connected for co-rotation with the electric motor; a first gear provided for co-rotation on the transmission shaft; a second gear engaged with the first gear; a planetary gear apparatus, wherein the second gear is connected for co-rotation to an input end of the planetary gear apparatus; and a differential mechanism, wherein an output end of the planetary gear apparatus is connected for co-rotation to an input end of the differential mechanism, wherein, the second gear, the planetary gear apparatus and the differential mechanism are coaxially provided.

According to an embodiment, the planetary gear apparatus includes: a sun gear serving as the input end of the planetary gear apparatus and connected for co-rotation to the second gear; a planetary carrier serving as the output end of the planetary gear apparatus and located radially outside of the sun gear; an outer gear ring fixed to a housing of the electrical bridge driving system, surrounding the sun gear and the planetary carrier; and a plurality of planetary gears each rotatably connected to the planetary carrier, and arranged to be engaged with the outer gear ring and the sun gear.

According to an embodiment, the differential mechanism includes: a differential mechanism case serving as the input end of the differential mechanism, being rotatably supported on the housing and connected for co-rotation to the planetary carrier; a first half axle passing through the sun gear and the second gear along an axial direction; and a second half axle extending from the differential mechanism along a direction away from the planetary gear apparatus.

The second gear may be integrally formed with the sun gear.

The sun gear may be supported on the differential mechanism case by means of bearings, and the second gear may be supported on the housing by means of bearings.

The planetary carrier may be integrally formed with the differential mechanism case.

The electrical bridge driving system may also include: a third gear connected for co-rotation to the first gear and capable of engaging with a parking apparatus of the vehicle to lock the rotation of the half axles of the differential mechanism.

The third gear may be integrally formed with the first gear.

The sun gear may be supported on the differential mechanism case in the axial direction by means of thrust bearings, and the second gear may be supported on the housing in the axial direction by means of thrust bearings.

A vehicle may include an electrical bridge driving system as described.

The electrical bridge driving system may have an integrated structure, for example, the electric motor shaft may be integrally formed with the transmission shaft, the parking gear may be integrally formed with an active transmission gear, the differential mechanism case may be integrally formed with the planetary carrier, and the sun gear may be integrally formed with a passive transmission gear. This integrated design can decrease the number of components, reduce cost and make the electrical bridge driving system more compact. The electrical bridge driving system may have an improved support structure, for example, to simplify the support structure for the input shaft and planetary gear apparatus. In addition, the planetary gear apparatus of the electrical bridge driving system can be better lubricated.

DETAILED DESCRIPTION

Figure 1:
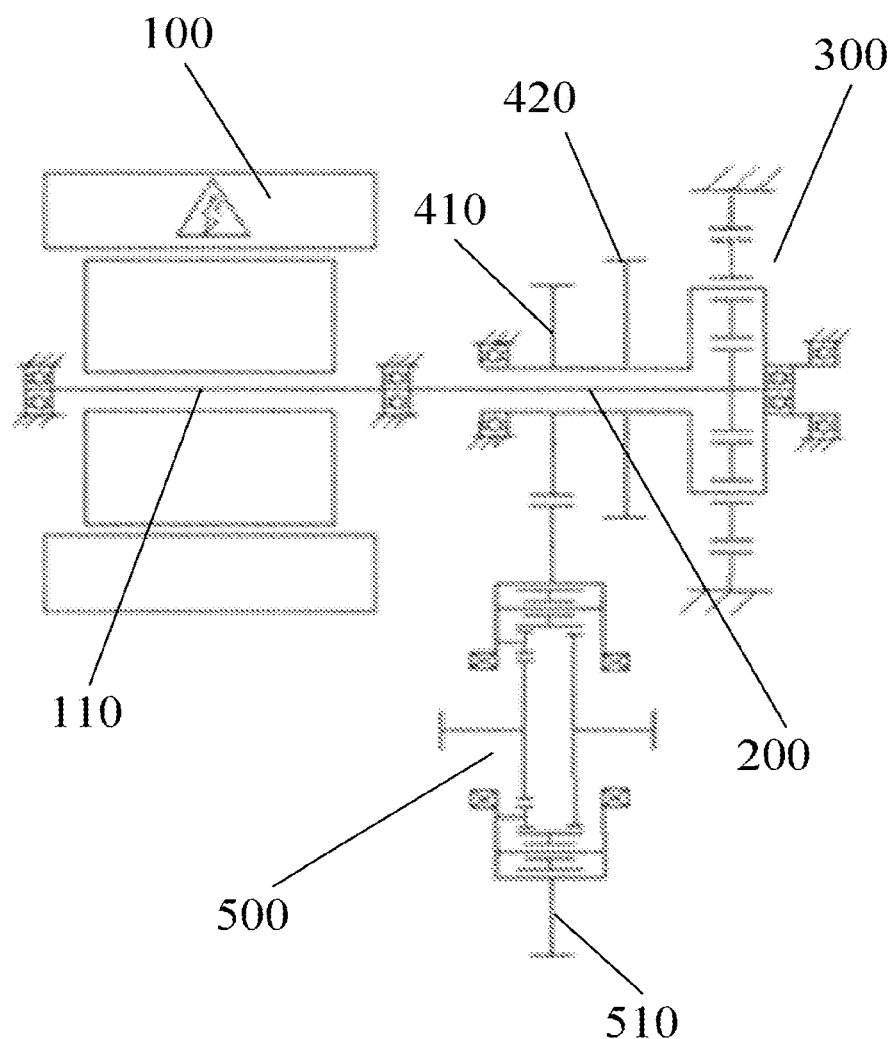
FIG. 1 is a schematic diagram of a prior art electrical bridge driving system.

Embodiments will be described below with reference to the drawings. The following detailed description and drawings are used to exemplarily illustrate the principle. The following description is made with reference to the drawings, unless otherwise specified, the same reference numerals refer to the same or similar elements in different drawings. The solutions described in the following exemplary implementation do not represent all the solutions. Rather, these solutions are merely examples.

The electrical bridge driving system may be installed in an electric vehicle or a fuel cell vehicle that uses an electric motor as a drive source or a hybrid vehicle that uses both an electric motor and an internal combustion engine as drive sources.

Figure 2:
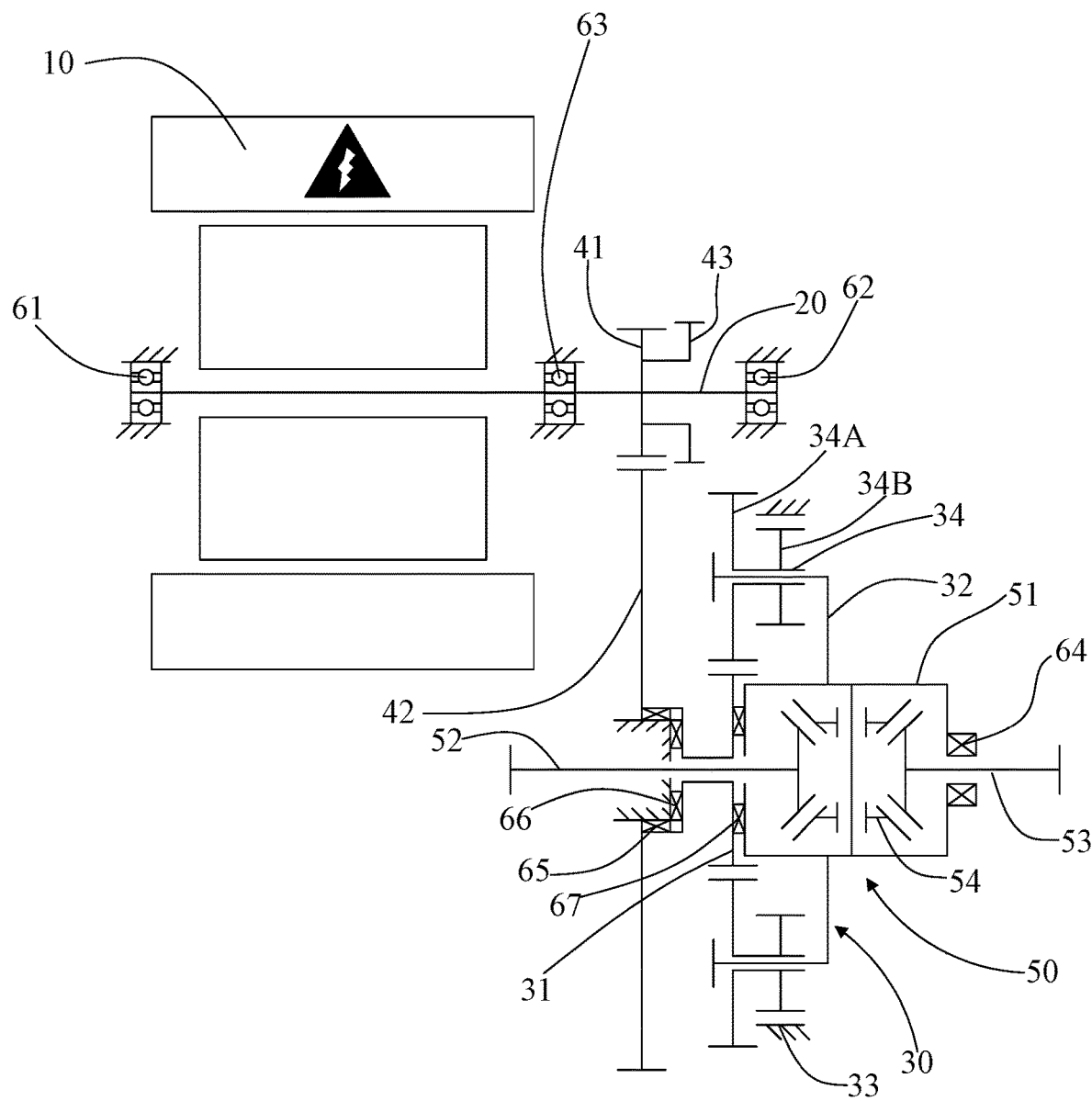
FIG. 2 is a schematic diagram of a first electrical bridge driving system.

FIG. 2 is a schematic diagram of an electrical bridge driving system. As shown in FIG. 2, the electrical bridge driving system may comprise a housing (not shown), an electric motor 10, a transmission shaft 20, a planetary gear apparatus 30, a first gear 41, a second gear 42 and a differential mechanism 50.

The electric motor 10 may comprise a stator and a rotor. Both the stator and the rotor are provided within the housing. The transmission shaft 20 may be connected for co-rotation to the electric motor 10, for example, the rotor of the electric motor 10. For example, the transmission shaft 20 and the rotor of the electric motor 10 may be connected for co-rotation by means of an interference press fit, a spline, or the like. The transmission shaft 20 may be rotatably supported on the housing. For example, as shown in FIG. 2, the transmission shaft 20 may be supported by means of a bearing 61 at one axial end, by means of a bearing 62 at the other axial end, and by means of a bearing 63 at an intermediate position. The transmission shaft 20 may serve as both the electric motor shaft of the electric motor 10 and the input shaft for transmission, which can simplify the support structure for the transmission shaft and increase the rigidity of the transmission shaft.

The first gear 41 may be provided on the transmission shaft 20, so that the first gear 41 and the transmission shaft 20 rotate at the same speed. In some embodiments, the first gear 41 may be connected to the transmission shaft 20 by means of a spline or the like. In an exemplary embodiment, the first gear 41 may be a cylindrical gear, such as a helical cylindrical gear.

The second gear 42 is engaged with the first gear 41. A rotation axis of the second gear 42 may be parallel to the transmission shaft 20 and offset along a radial direction. The second gear 42 is rotatably supported on the housing, for example, by means of bearings (described below). In an exemplary embodiment, the second gear 42 may be a cylindrical gear, such as a helical cylindrical gear.

The planetary gear apparatus 30 may serve as a gear-shift apparatus of the electrical bridge driving system. In an exemplary embodiment, the planetary gear apparatus 30 may reduce the rotation speed input by the electric motor 10. As shown in FIG. 2, the planetary gear apparatus 30 may include a sun gear 31, a planetary carrier 32, an outer gear ring 33 and a plurality of planetary gears 34.

The sun gear 31 may be rotatably supported, for example, on the differential mechanism 50 (described below). In an exemplary embodiment, the sun gear 31 may serve as the input end of the planetary gear apparatus 30 and be connected for co-rotation with the second gear 42. In an exemplary embodiment, the sun gear 31 may be integrally formed with the second gear 42.

The planetary carrier 32 is rotatably provided with respect to the sun gear 31. In an exemplary embodiment, the planetary carrier 32 may serve as the output end of the planetary gear apparatus 30 and be connected for co-rotation with an input end of the differential mechanism 50 (described below). The planetary carrier 32 is coaxial with the sun gear 31 and surrounds the sun gear 31 in the radial direction.

The outer gear ring 33 may be fixed to the housing. The outer gear ring 33 is configured to be coaxial with the sun gear 31 and surround the sun gear 31 and the planetary carrier 32.

The planetary gears 34 are arranged between the sun gear 31 and the outer gear ring 33 and are engaged with the sun gear 31 and the outer gear ring 33. Each planetary gear 34 is rotatably connected to the planetary carrier 32, for example, by means of pins and needle bearings. In an exemplary embodiment, the outer gear ring 33 may have radial inner teeth for engaging with the planetary gear 34. In some embodiments, as shown in FIG. 2, the planetary gear 34 comprises a first engagement tooth portion 34A and a second engagement tooth portion 34B provided sequentially along the axial direction, wherein the first engagement tooth portion 34A is engaged with the sun gear 31, and the second engagement tooth portion 34B is engaged with the outer gear ring 33. In an exemplary embodiment, the diameter of the first engagement tooth portion 34A is larger than that of the second engagement tooth portion 34B. Therefore, in the same radial space, the planetary gear apparatus 30 may achieve a larger transmission ratio, and may take advantage of the radial space of the differential mechanism case 51 due to the arrangement of the second engagement tooth portion 34B. In this case, the planetary gear apparatus 30 does not need to increase in size in the radial and axial directions, and helps to achieve a compact arrangement of the electrical bridge driving system.

The differential mechanism 50 may include a differential mechanism case 51, a first half axle 52, a second half axle 53, and a differential mechanism gear set 54 and the like. The differential mechanism case 51 may be rotatably supported on the housing. In an exemplary embodiment, as shown in FIG. 2, the differential mechanism case 51 may be supported on the housing by means of a bearing 64 at one axial end, and may be supported on the outer gear ring 33 fixed to the housing by means of the planetary gear 34 at the other axial end. In an exemplary embodiment, the differential mechanism case 51 may serve as the input end of the differential mechanism 50 and be connected for co-rotation with the planetary carrier 32. In an exemplary embodiment, the differential mechanism case 51 is formed integrally with the planetary carrier 32. The differential mechanism gear set 54 is used to transfer power from the input end to the output end of the differential mechanism 50, for example, from the differential mechanism case 51 to the half axles 52 and 53. In some embodiments, the differential mechanism gear set 54 may be a bevel gear set.

The first half axle 52 and the second half axle 53 are used to connect to the wheels of the vehicle, respectively. The first half axle 52 and the second half axle 53 are coaxial. In some embodiments, the first half axle 52 and the second half axle 53 may be connected for co-rotation with the half axle gears in the differential mechanism gear set 54, respectively. The first half axle 52 and the second half axle 53 are respectively located on either axial side of the differential mechanism gear set 54. The first half axle 52 extends from the differential mechanism gear set 54 through the differential mechanism case 51, the planetary gear apparatus 30 (the sun gear 31) and the second gear 42 along one axial direction. The second half axle 53 extends from the differential mechanism gear set 54 through the differential mechanism case 51 along the opposite axial direction. In an exemplary embodiment, the second gear 42, the sun gear 31 and the first half axle 52 may be coaxially provided.

Figure 3:
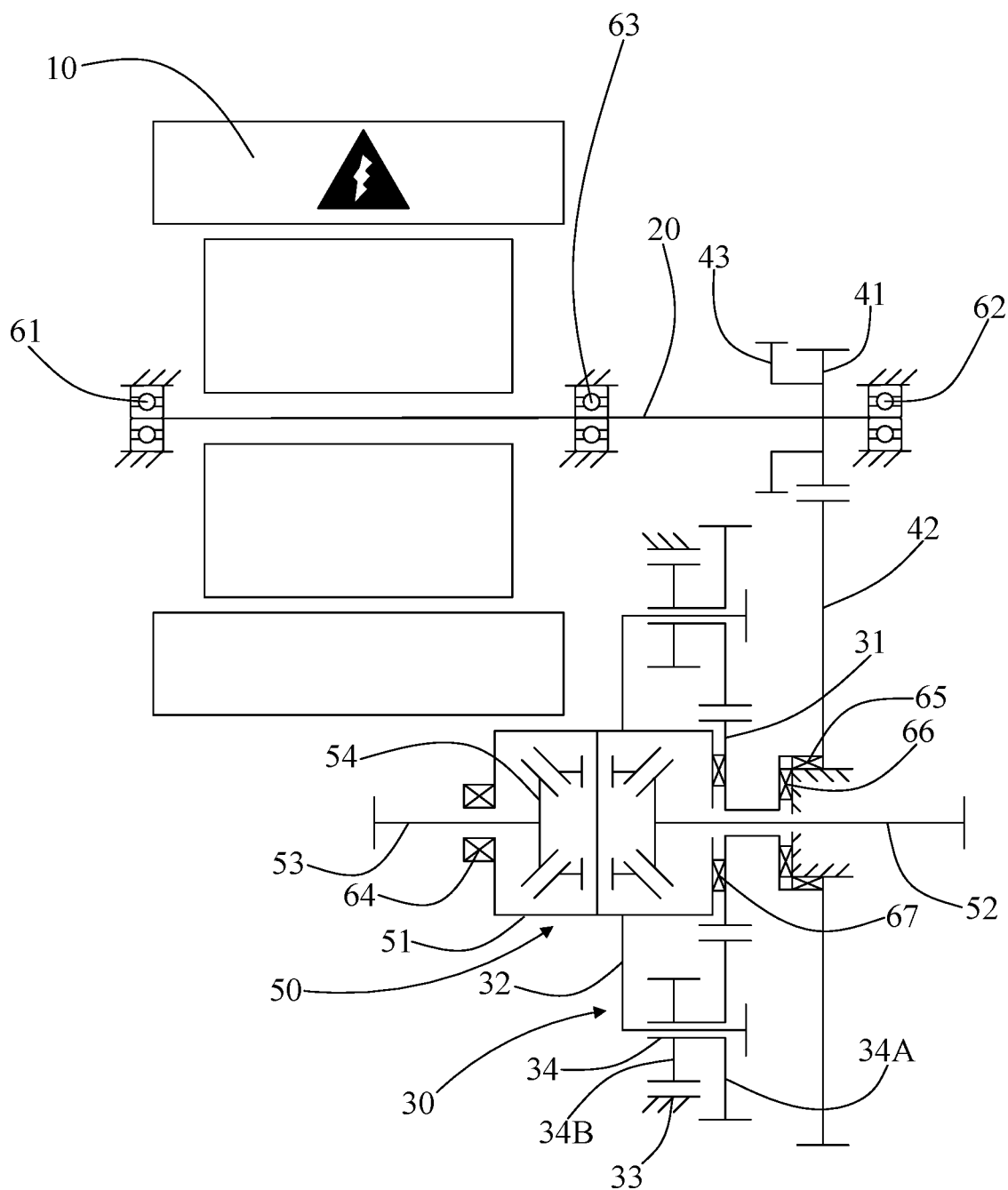
FIG. 3 is a schematic diagram of a second electrical bridge driving system.

In the embodiment shown in FIG. 2, the planetary gear apparatus 30 and the differential mechanism 50 (the differential mechanism case 51 and the differential mechanism gear set 54) are provided on the side of the second gear 42 away from the electric motor 10. FIG. 3 is a schematic diagram of an electrical bridge driving system according to a second embodiment. It should be noted that the embodiment shown in FIG. 3 is the same as the embodiment shown in FIG. 2 in many respects, so the same reference numerals are used to indicate the same or similar components and signals. In the embodiment shown in FIG. 3, the planetary gear apparatus 30 and the differential mechanism 50 (the differential mechanism case 51 and the differential mechanism gear set 54) are provided on the side of the second gear 42 close to the electric motor 10. Otherwise, the electrical bridge driving system shown in FIG. 3 has a configuration similar to that shown in FIG. 2.

In the embodiments shown in FIGS. 2 and 3, the sun gear 31 and the second gear 42 may be supported on the housing in the radial direction by mean of a bearing 65, and may be supported on the housing and the differential mechanism case 51 in the axial direction by mean of bearings 66 and 67, respectively. In an exemplary embodiment, the bearings 66 and 67 may be thrust bearings.

The electrical bridge driving system may also include a third gear 43 to serve as a parking gear. As shown in FIGS. 2 and 3, the third gear 43 may be connected for co-rotation with the first gear 41. In an exemplary embodiment, the third gear 43 and the first gear 41 are connected by means of a spline. In other embodiments, the third gear 43 may be integrally formed with the first gear 41. The third gear 43, when engaged with an external parking apparatus (not shown), may lock the rotation of the transmission shaft 20 and thus the half axles 52 and 53 of the differential mechanism 50.

When the electrical bridge driving system is in operation, the power of the electric motor 10 is transferred to the first half axle 52 and the second half axle 53 via the transmission shaft 20, the first gear 41, the second gear 42, the sun gear 31, the planetary gear 34, the planetary carrier 32, the differential mechanism case 51 and the differential mechanism gear set 54.

The third gear 43 described above serving as the parking gear is connected to the first gear 41. The parking gear may also be provided in other locations as long as it's capable of locking the rotation of the half axles of the differential mechanism when engaged with the external parking apparatus. For example, the parking gear may be connected for co-rotation with the second gear 42 or the sun gear 31 or the like.

Although the electrical bridge driving system has been described with reference to exemplary embodiments, it should be understood that it is not limited to the configurations and methods of the above-described embodiments. In addition, although various elements of the electrical bridge driving system are shown in various exemplary combinations and configurations, other combinations may include fewer or more elements.

We claim:

1. An electrical bridge driving system for a vehicle, comprising:
    an electric motor;
    a transmission shaft connected for co-rotation to the electric motor;
    a first gear provided for co-rotation with the transmission shaft;
    a second gear engaged with the first gear;
    a planetary gear apparatus,
    a sun gear serving as the input end of the planetary gear apparatus and integrally formed with the second gear;
    a planetary carrier serving as the output end of the planetary gear apparatus and located radially outside of the sun gear;
    an outer gear ring fixed to a housing of the electrical bridge driving system, surrounding the sun gear and the planetary carrier;
    a plurality of planetary gears each rotatably connected to the planetary carrier, and engaged with the outer gear ring and the sun gear; and
    a differential mechanism;
    wherein an output end of the planetary gear apparatus is connected for co-rotation with an input end of the differential mechanism;
    wherein the second gear, the planetary gear apparatus, and the differential mechanism are coaxial;
    wherein the sun gear is supported on a differential mechanism case in the axial direction by means of thrust bearings, and the second gear is supported on the housing in the axial direction by means of second thrust bearings.

2. The electrical bridge driving system according to claim 1, wherein, the differential mechanism comprises:
the differential mechanism case serving as the input end of the differential mechanism, being rotatably supported on the housing and connected for co-rotation with the planetary carrier;
a first half axle passing through the sun gear and the second gear along an axial direction; and
a second half axle extending from the differential mechanism along a direction away from the planetary gear apparatus.

3. The electrical bridge driving system according to claim 1, wherein the planetary carrier is integrally formed with the differential mechanism case.

4. The electrical bridge driving system according to claim 3, further comprising a third gear connected for co-rotation with the first gear and adapted for engagement with a parking apparatus of the vehicle to lock the rotation of the half axles of the differential mechanism.

5. The electrical bridge driving system according to claim 4, wherein the third gear is integrally formed with the first gear.

6. A vehicle comprising the electrical bridge driving system according to claim 1.

* * * * *